United States Patent [19]
Bonga

[11] 4,417,843
[45] Nov. 29, 1983

[54] WAYSLESS MACHINE TOOL TABLE

[75] Inventor: Benno I. Bonga, Crans, Switzerland

[73] Assignee: Ateliers des Charmilles, S.A., Geneva, Switzerland

[21] Appl. No.: 223,812

[22] Filed: Jan. 9, 1981

[30] Foreign Application Priority Data

Jan. 25, 1980 [CH] Switzerland ............................ 596/80

[51] Int. Cl.³ ............................................. B23Q 7/00
[52] U.S. Cl. ...................................... 414/676; 269/60; 269/73; 318/573; 414/749
[58] Field of Search .................. 414/1, 4, 5, 676, 729, 414/730, 744 R, 749, 750; 269/20, 58, 60, 73, 172; 318/573, 687

[56] References Cited

U.S. PATENT DOCUMENTS

| | | | |
|---|---|---|---|
| 3,006,245 | 10/1961 | Bycer et al. | 269/73 |
| 3,376,764 | 4/1968 | Schardt | 269/20 X |
| 3,569,814 | 3/1971 | Rosenberg | 318/573 |
| 3,849,857 | 11/1974 | Murray | 269/60 |

FOREIGN PATENT DOCUMENTS

| | | | |
|---|---|---|---|
| 2433954 | 1/1976 | Fed. Rep. of Germany | 414/729 |
| 2800273 | 7/1979 | Fed. Rep. of Germany | 414/730 |
| 631329 | 11/1978 | U.S.S.R. | 414/4 |

*Primary Examiner*—Leslie J. Paperner
*Attorney, Agent, or Firm*—Hauke and Patalidis

[57] ABSTRACT

A machine tool provided with a movable table supported by a stationary table, the movable table being displaceable relative to the stationary table in all directions and being supported by the stationary table by pressurized fluid bearing. The movable table is positioned by at least three actuators pivotally connected at one end to the stationary table and at their other end to the movable table such that the lengths of the actuators, controlled by an appropriate numerical control system, result in a predetermined position of the movable table relative to a reference position.

9 Claims, 5 Drawing Figures

WAYSLESS MACHINE TOOL TABLE

BACKGROUND OF THE INVENTION

The present invention relates to a machine tool provided with a movable table supporting a workpiece.

A machine tool table, supporting a workpiece, must often be capable of carrying a very heavy load, and it must be easily displaced along two separate axes disposed in the plane of the table and perpendicular to each other. Sometimes the machine tool table must be displaceable along a third axis, for example when it is rotatable around an axis perpendicular to the plane of the table. At a dynamic point of view, such a table is said to be constrained to be displaced parallel to a plane. Such an arrangement of movable machine tool table is commonly in use, for example, on electrical machining apparatus, such as electrical discharge machining apparatus and electro-chemical machining apparatus. Conventionally, linear motions of the table are effected by means of an appropriate ways and co-operating slide system comprising generally ways integral with or attached to the base of the machine tool, an intermediary slide or saddle linearly displaceable along the ways and itself provided with a second arrangement of ways disposed in a direction perpendicular to the first, and a table mounted on the second ways and displaceable relative to the saddle in one direction and displaceable relative to the machine base in all directions. In such manner the tool, which in electrical machining apparatus is generally constrained to be displaced only vertically, or only vertically with lateral displacements of very small amplitude, can be disposed over any point of the plane of the movable table.

Conventional ways, although almost universally used, present several important inconveniences. First, they are costly to manufacture for many understandable reasons. Conventional ways require many machining operations and thermal treatments in order to provide accuracy and smooth functioning.

A very important inconvenience, more particularly with respect to tables which are displaced by a servo system, is the inconvenience resulting from friction.

First of all, servo motors with sufficient power are required to displace the table and, furthermore, sufficiently rigid assemblies must be used to avoid "stick-slip". "Stick-slip" is a well known phenomenon which causes a higher coefficient of friction to appear when parts capable of being slidably displaced each relative to another are at rest than when they are displaced relative to each other, such that a predetermined force is required to displace a machine tool table from its position of rest. If a ways and slide system is poorly designed, the deformation under load of the surfaces in engagement causes sudden release of the potential energy accumulated during the deformation of the surfaces which results in a poorly defined advance, for example continuous advance is transformed into an advance being effected by steps, with an accompanying lack of machining precision. Such an inconvenience has been partially eliminated in the past as a result of providing slides with linear ball bearings, but with an accompanying increase in complexity and in the accuracy with which the ways and slides must be machined, with an accompanying large increase in cost. Ball screws have also been provided, but they present the same inconvenience of complexity and high costs. There are other important inconveniences to be considered such as wear which causes an important widening of assembly clearances. Such a problem is particularly acute in some electro-erosion apparatus in which horizontal displacements of the table are continuously provided in the course of a machining operation. There are yet further problems such as, for example, providing adequate lubrication of the ways and slide assemblies, or providing accurate machining and mounting of the ways which must be perfectly parallel or perfectly perpendicular.

SUMMARY OF THE INVENTION

The principal object of the invention is to generally remedy the hereinbefore mentioned inconveniences, more particularly by providing a structure which is less costly than the structures of the prior art, which has simple geometric surfaces requiring less precise machining, which provides a substantial decrease of friction, which avoids stick-slip, and which results in substantially simplifying the assembly of the diverse elements of the table.

The machine tool of the invention comprises a movable table on which is mounted a workpiece, the table being arranged to be displaced parallel to a plane defined by a stationary table, the movable table being supported on the stationary table in such manner that the movable table is displaceable relative to the stationary table in all directions in a single plane by means of at least three positioners or actuators as, for example, screwjacks displacing the movable table, the actuators being pivotably mounted between the stationary and the movable tables, and a servo system and servo motors for controlling the length of the actuators such as to position the movable table relative to the stationary table instantaneously in a predetermined position.

The present invention permits to do away with conventional ways and slide arrangements and avoids all the inherent inconveniences of such structures, namely high manufacturing costs, complexity of the geometry of the surfaces in sliding engagement, friction, stick-slip, and assembly operations requiring skilled personnel. The invention permits to use known low friction bearing means such as air bearings, oil film bearings, and ball or needle bearings. The present invention provides a machine tool table for supporting a workpiece that presents the advantages of all the surfaces in engagement being machined and ground only in a single plane, of low friction, of presenting no stick-slip and being easily assembled, which altogether result in a much less costly structure. The resulting movable table is capable of basically accomplishing all the functions of conventional cross-slide tables. In addition, the machine tool table of the invention may be displaced to any angular position relative to an axis perpendicular to the plane in which linear motions are effected, a function which, prior to the invention, required tables to be mounted on a rotatable platform. Such a function can be accomplished by the present invention without any additional mechanical parts.

These and other advantages of the present invention will become apparent to those skilled in the art when the following description of the best mode contemplated for practicing the invention is read in conjunction with the accompanying drawing wherein two examples of structure of the present invention are schematically illustrated and in which:

DETAILED DESCRIPTION OF THE PREFERRED EMBODIMENTS

Figure 1:
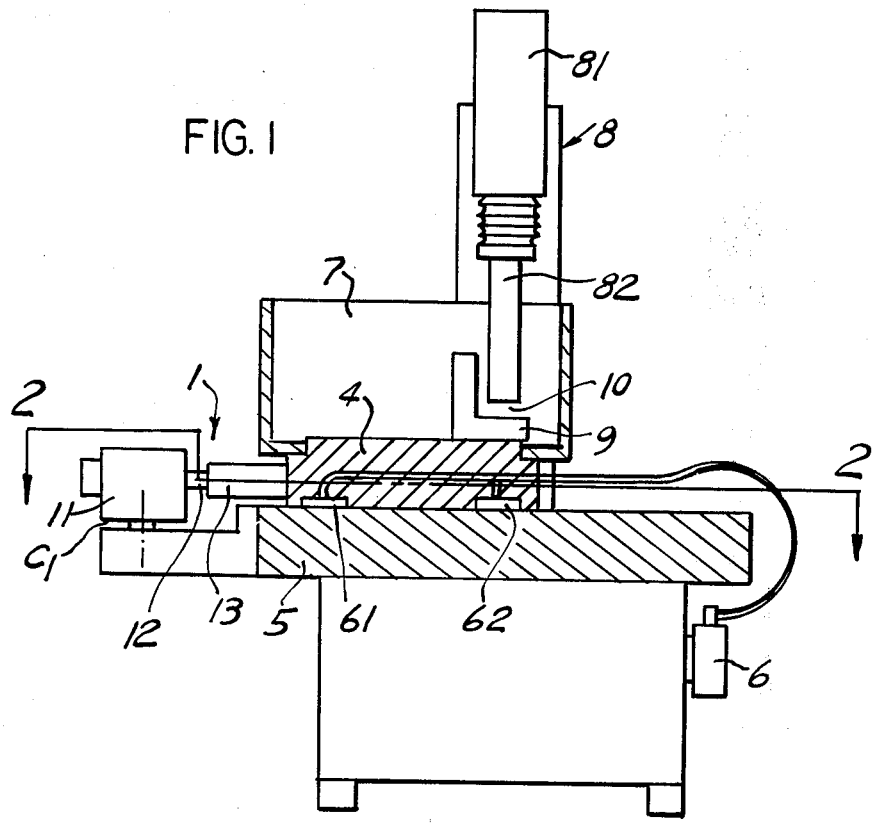
FIG. 1 is a machine tool, such as an electro-erosion apparatus, shown in elevation with some portions in section, and having a wayless table supported by an air film bearing and displaced by three actuators.

Referring to the drawing and more particularly to FIG. 1, there is illustrated the general structure of a machine tool such as an electro-erosion apparatus, an electrical discharge machining apparatus for example, comprising a movable table 4 supporting a tank 7 filled with a dielectric fluid and in which is mounted a workpiece 9 to be machined. The apparatus is provided with a machining head 8 comprising a housing 81 containing an electrical or hydraulic servo motor, not shown, an electrode tool 82 mounted on the end of the machining head 8 being displaced by the electrical or hydraulic servo motor along a vertical axis. Material removing electrical discharges, established across a gap 10 between the workpiece 9 and the electrode tool 82, are supplied by a pulse generator, not shown. The movable table 4 is not supported by conventional ways, but is supported from a stationary table 5 by an air bearing system schematically represented by a pump 6 supplying pressurized air to a pair of chambers 61 and 62 in the lower surface of the table 4.

Such air bearings are well known, and therefore requires no further detailed description. They are capable of holding the movable table 4 at a predetermined constant distance from the stationary table 5 and they allow, almost without friction, displacements of the movable table 4 in all directions parallel to the plane of the stationary table 5. The resulting displacement of the table 4 is analytically represented by component linear displacements along two axes in the plane of the stationary table 5, and in rotation around an axis perpendicular to such plane, which result in three axes of free motion for the movable table 4.

Although an example of air bearing is specifically illustrated schematically at FIG. 1, it will be appreciated that it is not the only type of bearing that can be used. An oil film bearing could be used, or a ball or needle bearing. All such bearings have in common that they enable motions in all directions by one bearing surface relative to another, and that they have a very low coefficient of friction, with all the resulting advantages.

A biasing means such, as a spring biasing means, may be used to urge the movable table 4 towards the stationary table 5 to assist gravity in applying the movable table toward the stationary table.

Figure 3:
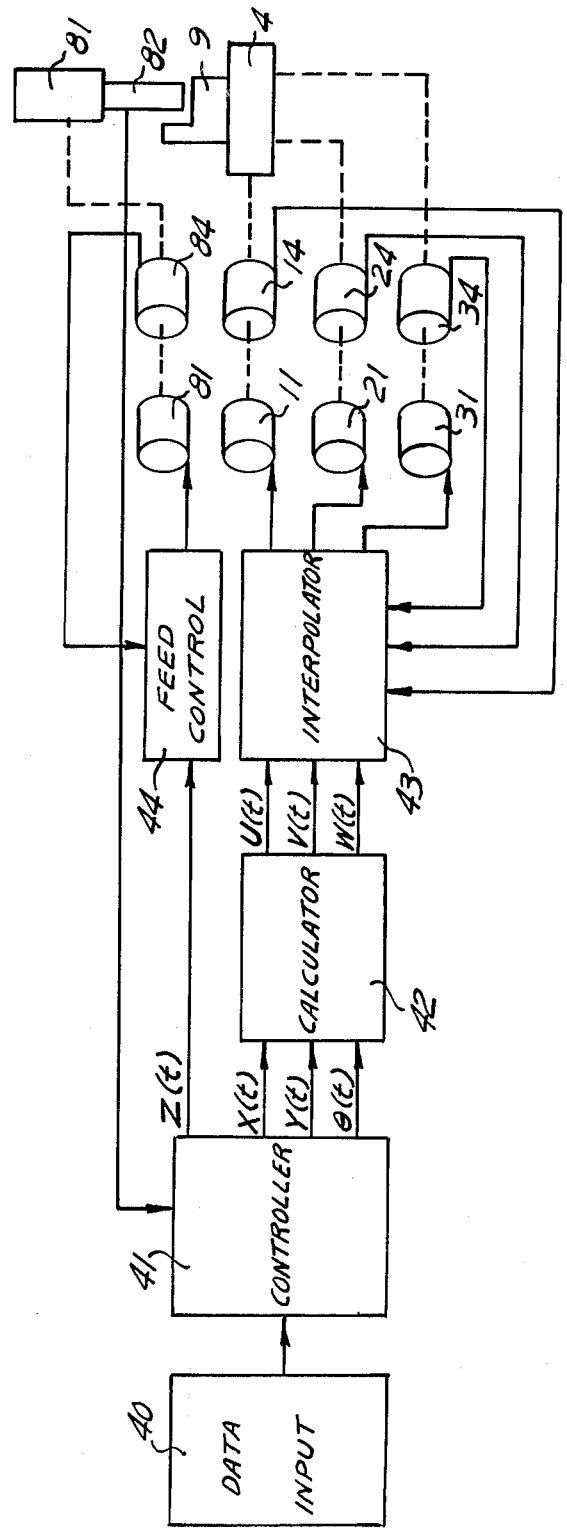
FIG. 3 is a block diagram of the electronic control of the servo motor for displacing the table of the machine tool of FIGS. 1–2.

Guiding of the table 4 and displacement of the table 4 relative to the stationary table 5 is effected by three positioners or actuators, such as screwjacks 1, 2 and 3, best shown at FIG. 3. At one end of the screwjack 1 there is a pivot $C_1$ for connection to the stationary table 5, the pivot $C_1$ having either a vertical axis or being a ball and socket joint. The other end of the screwjack 1 is connected to the movable table 4 by means of a similar pivot $P_1$. The screwjacks 2 and 3 are similarly mounted between the stationary table 5 and the movable table 4 by means of pivots $C_2$ and $P_2$ and pivots $C_3$ and $P_3$ respectively. It will be appreciated that several different structures may be used for the actuators. In the example of structure of FIGS. 1 and 3, each of the actuators, such as screwjack 1 for example, comprise an electric motor 11 driving a lead screw 12 in rotation, the lead screw 12 threading through a nut 13 disposed at the end of a tubular member 13a, the other end of the tubular member 13a being connected to the table 4 through the pivot $P_1$. The electric motor 11 is a stepping motor or, alternatively, it is a DC motor associated with an angular rotation discriminator or detector shown only at FIG. 3, and designated schematically by reference numeral 14. Alternatively, the actuators 1-3 may consist of hydraulic jacks, each in the form of a hydraulic cylinder-piston assembly, whose stroke is electrically measured either by a magnetic linear position detector or by a digital optical scale. In such an arrangement, the position detector 14 of FIG. 3 is a linear position detector. The other two actuators, such as the screwjacks 2 and 3, are similar to the actuator 1, and are provided respectively with the servo motors 21 and 31 and the corresponding position detectors 24 and 34, shown only at FIG. 3. Although it will be appreciated that any number of actuators may be used, such as four actuators or more, the number of actuators being used are the equivalent of three elementary actuators as far as independently controlled displacements of the movable table 4 are concerned.

The common point of the diverse possible arrangement resides in the capability of electronically controlling the actuator lengths $C_1P_1$, $C_2P_2$, and $C_3P_3$, referred to hereinafter as u, v and w. It is preferable to utilize for the electrode tool vertical displacement servo system 8 an arrangement similar to that adopted for the horizontal actuators, and the axis controlled by the vertical servo system is referred to hereinafter as the z axis.

In order to simplify the calculations required for precise position control, it is advantageous to define a zero reference position as follows: when the actuators are aligned parallel to the edges of the stationary table 5, the coordinates of the movable table 4 are also parallel to those edges. The length of the actuators corresponding to the zero reference position are respectively $u_0$, $v_0$ and $w_0$. In order to provide symmetrical displacements, it is further advantageous to arrange the system such that the zero reference positions of the actuators 2 and 3 have equal length $v_0$, and that the center of the movable table 4 coincide with the center O of the stationary table 5. In arrangements where parallelism between the edges of the stationary table 5 and the edges of the movable table 4 is difficult or costly to achieve by electronic control, it becomes advantageous to provide a mechanical setting of the length of each of the actuators. For example, one, or more, hydraulic or screwjack actuator may be provided with a nut-screw arrangement, as shown at 25 at FIG. 2, for manually setting the parallelism of the table edges by adjusting the initial length of the actuator prior to operating the apparatus.

Figure 2:
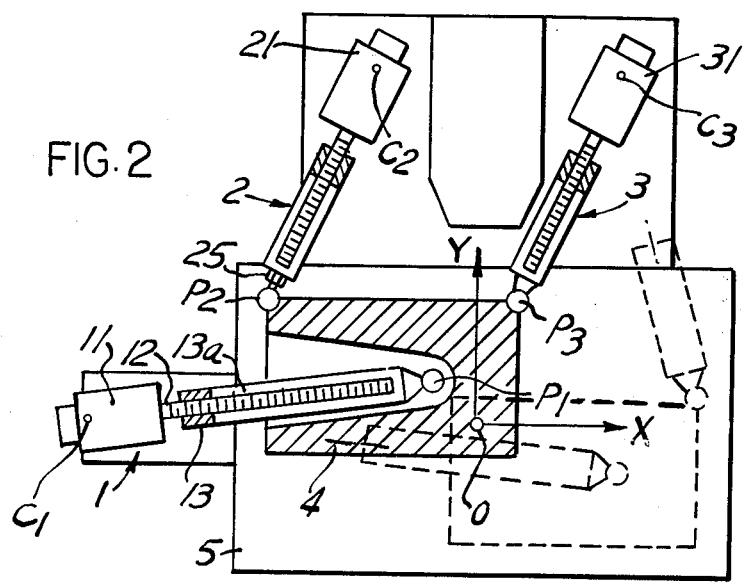
FIG. 2 is a section along line 2—2 of FIG. 1.

FIG. 3 is an example, in a block diagram form, of an electronic control system for the motion of the movable table 4, FIGS. 1-3. A data processor 40 accepts at its input information data representing the programmed trajectory of the movable table 4, for example a predetermined displacement along the axis OX of FIG. 2. The information data may consist of an appropriate command program manually entered or of a program read from a perforated tape or magnetic tape, or any other numerical control system. The input data is applied to a controller 41, as is well known in the numerical control art, which provides at its output command signals X(t), Y(t), Z(t) and θ(t). The command signals, either in a digital or an analog form, control the horizontal motions of the table 4, the vertical motions of the electrode tool 82, FIG. 1, and, if required, the rotation of the movable table 4. In a particular machine tool application, such as that relating to electro-erosion of a workpiece, it is necessary that the controller 41 monitor through an appropriate feedback the voltage of the electrode tool 82 relative to the workpiece, such as to slave the relative motion between the electrode workpiece and the electrode tool to the machining conditions. For example, during displacement along the axis OX, the command signals X(t) are converted to electrode tool retraction command signals in the event of a short circuit at the gap. The command signal X(t), Y(t) and θ(t) are transferred from the controller 41 to a calculator or function generator 42, while the command signal Z(t) is supplied directly from the controller 41 to a control unit 44 for the electrode feed servo. The servo feed control unit 44 includes a power amplifier supplying an amplified signal to the servo motor 81 feeding the electrode tool 82. In arrangements wherein the servo motor 81 is a stepping motor, a group of lines symbolically represented by a single line is used for connecting the electric servo motor 81 to the output of the servo feed control 44. Alternatively, a DC motor may be used for the servo motor 81, coupled with an angular position detector 84. The angular position detector 84 provides at its output a signal representive of the angular position of the servo motor output shaft by means of a plurality of parallel data information represented by a single connection from the position detector 84 to the servo feed control unit 44.

A hydraulic actuator could be used instead of an electric servo motor 81. The representation is the same in schematic logic symbolic representation, except that the position indicator 84 is a linear position indicator.

The calculator or function generator 42 converts the command signals X(t), Y(t) and θ(t) into, respectively, signals U(t), V(t) and W(t) which are representative of the length of each actuator, the change in length of the actuators in turn causing appropriate displacements of the movable table along appropriate cartesian coordinates in the plane OXY, FIG. 2. Those signals are applied to an interpolator 43 which in turn applies appropriate signals activating the servo motors 11, 21 and 31 (see also FIGS. 1-2) and therefore varies the length of each of the actuators 1, 2 and 3.

It will be appreciated that a system according to the invention must include at least three actuators in order to achieve a predetermined position of the movable table. Assuming that, for example, the actuator 1 is omitted, as a result of energizing the actuators 2 or 3, the points C₂, P₂, C₃ and P₃ form a parallelogram which is freely deformable, even though the length of the actuators 2 and 3 remain constant. By adding the third actuator 1, the parallelogram is no longer freely deformable, and the position of the movable table 4 is exactly determined, provided that the pivot P₁, P₂ and P₃ are not common. At the point of view of dynamics the movable table 4 is a system having three degrees of freedom, and the three actuators 1, 2 and 3 represent three connection equations of the table such that the position of the table is instantaneously determined by the respective length of each actuator. With reference to the zero reference position of the table, and assuming that x and y represent the difference between the zero reference position and the instantaneous position, and limiting the displacement to a simple one, the relationship between the desired displacement x and y and the length of the actuators is represented by the following equations:

$$u = \sqrt{(x + u_o)^2 + y^2}$$

$$v = w = \sqrt{x^2 + (v_o - y)^2}$$

Those equations, in the event of a simple translation motion of the table, define entirely the function of the calculator 42 and of the interpolator 43, namely that of translating the data representing the desired displacements x and y into appropriate command signals for the actuators.

In the event that it is desired to impose upon the movable table a rotation motion relative to the zero axis reference position, the actuators 2 and 3 are differentially controlled. Trigonometric functions permit to establish more complex appropriate equations permitting to convert the values x, y and θ to u, v and w. In the event that the servo motors 11, 21 and 31 are not stepping motors, positioning indicators 14, 24 and 34 are required to feed back to the interpolator 43 information representing the instantaneous position, or length of the corresponding actuators. In arrangement where the displacement of the movable table is limited to linear displacements, the schematic of FIG. 3 is simplified by omitting the line θ(t) and the line w(t) between the calculator 42 and the interpolator 43.

Figure 4:
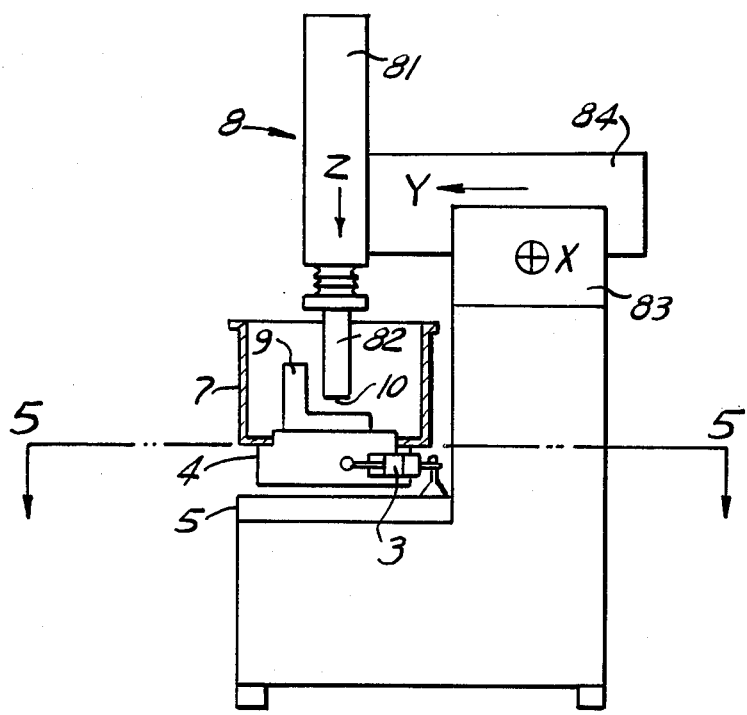
FIG. 4 is another example of an electro-erosion apparatus, shown in elevation, particularly well adapted for providing displacement of the table by means of hydraulic jacks of short strokes, controlled by a simplified electronic control.

FIG. 4 represents another example of machine tool such as an electro-erosion apparatus. The only difference between the arrangement illustrated at FIG. 4 and that of FIG. 3 is that the arrangement of FIG. 4 utilizes short stroke hydraulic actuators co-operating with a simplified control system permitting to omit the calculator or function generator 42 of FIG. 3. At FIG. 4 also, there is illustrated a movable table 4, a stationary table 5, a dielectric tank 7 in the case of an EDM apparatus, or an electrolyte tank 7 in the case of an ECM apparatus, a workpiece 9, an electrode tool 82 forming a machining gap 10 with the workpiece, and a feed servo motor 81 feeding the electrode tool 82 along a vertical or Z-axis. Because the movable table 4 is displaced by short stroke actuators, the machining head 8 is supported by a cross-slide 83 displacing the machining head 8 along the X-axis, and a cross-slide 84 displacing the machining head 8 along the Y-axis, the displacements provided by the cross-slides 83 and 84 having each a much longer stroke than the displacements provided by the hydraulic actuators. The long stroke displacements provided by the cross-slides 83 and 84 are effected at relatively slow speed and are not numerically controlled, such that the servo motors actuating the cross slides are low-performance and relatively cheap servo motors. The actuators 1, 2 and 3, best shown at FIG. 5, may be screwjacks as shown more specifically at FIG.

2, or they may be simple direct action hydraulic jacks, as the stroke of the actuators is relatively short.

Figure 5:
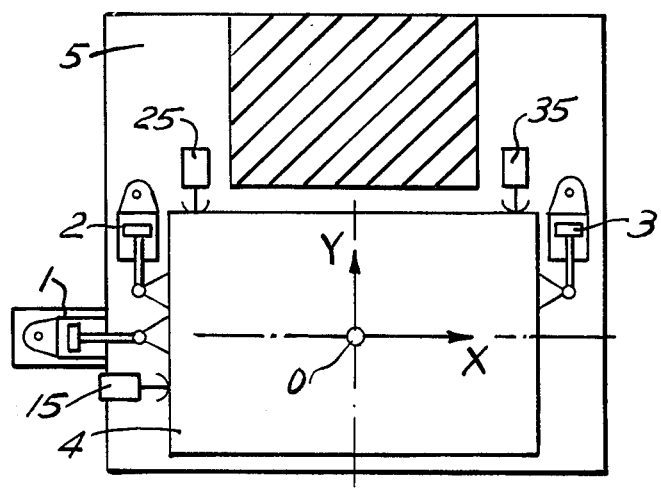
FIG. 5 is a section along line 5—5 of FIG. 4.

As schematically illustrated at FIG. 5, feelers 15, 25 and 35 are mounted proximate to the actuators 1, 2 and 3 on the stationary table 5. The ends of the feelers engage appropriate plane surfaces formed on the sides of the movable table 4, and the feelers consequently directly measure the displacements x and y, as long as the movable table 4 is not displaced in rotation. The numerical control of the actuators is effected according to the usual closed loop servo system. For example, with respect to the actuator 1, the commanded displacement x is compared with the instantaneous position as detected by the feeler 15 for forming a command signal which, after amplification, is applied to the servo valve controlling the displacement of the piston of the hydraulic actuator 1. Consequently, the displacement of the hydraulic actuator piston is stopped not when a predetermined length of the actuator is achieved, but when a predetermined displacement x of the movable table 4 is achieved.

Such an arrangement permits to control directly the displacements x and y, such that the calculator or function generator 42 of FIG. 3 is no longer required, as long as rotation of the table 4 is prevented by providing the actuators 2 and 3 with equal lengths.

The examples of structures illustrated and hereinbefore described have particular applications for conventional electro-erosion machines such as EDM and ECM apparatus. It will be however appreciated that the invention has many applications in travelling wire EDM apparatus and also, generally, in any other conventional machine tool.

Having thus described the present invention by way of examples of structural embodiments thereof, modifications whereof will be apparent to those skilled in the art, what is claimed as new is as follows:

1. A machine tool comprising a stationary table, a movable table supported by and displaceable relative to said stationary table, a workpiece mounted on said movable table, bearing means between said tables permitting displacement of said movable table relative to said stationary table in perpendicular directions within a single plane substantially parallel to said stationary table, at least three variable length linear actuators for displacing said movable table in said plane, said linear actuators having their axes in a single plane substantially parallel to said stationary table, pivot means connecting an end of each of said linear actuators to said stationary table and an other end to said movable table, and means for controlling the length of each of said linear actuators for causing said movable table to occupy a predetermined position relative to said stationary table.

2. The machine tool of claim 1 wherein said bearing means is a pressurized fluid bearing means.

3. The machine tool of claim 1 further comprising numerical control means for converting appropriate position information data into command signals for each of said linear actuators.

4. The machine tool of claim 1 further comprising position feed back means for each of said linear actuators for stopping the operation of each of said linear actuators when a predetermined position of said movable table relative to said stationary table is obtained.

5. The machine tool of claim 1 further comprising means on one of said linear actuators for manually adjusting the angular position of said movable table relative to said stationary table.

6. The machine tool of claim 3 further comprising position feed back means for each of said linear actuators for stopping the operation of each of said linear actuators when a predetermined position of said movable table relative to said stationary table is obtained.

7. A machine tool comprising a stationary table, a movable table supported by and displaceable relative to said stationary table, a workpiece mounted on said movable table, bearing means between said tables permitting displacement of said movable table relative to said stationary table in perpendicular directions within a single plane substantially parallel to said stationary table, at least three variable length linear actuators for displacing said movable table in said plane, said linear actuators having their axes in a single plane substantially parallel to said stationary table, pivot means mounting an end of each of said linear actuators to said stationary table and an other end to said movable table, and position feedback means for detecting the instantaneous position of said movable table relative to said stationary table for stopping the operation of said linear actuators when a predetermined position of said movable table relative to said stationary table is obtained.

8. The machine tool of claim 7 wherein said bearing means is a pressurized fluid bearing means.

9. The machine tool of claim 7 further comprising numerical control means for converting appropriate position information data into command signals for each of said linear actuators.

* * * * *